United States Patent

Ahn

(10) Patent No.: US 8,965,645 B2
(45) Date of Patent: Feb. 24, 2015

(54) METHOD AND SYSTEM FOR AUTOMATED CONTROL OF TRANSMISSION RATIO CHANGE

(75) Inventor: Samuel S. Ahn, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1206 days.

(21) Appl. No.: 12/492,066

(22) Filed: Jun. 25, 2009

(65) Prior Publication Data

US 2010/0332090 A1    Dec. 30, 2010

(51) Int. Cl.
- G06F 19/00 (2011.01)
- F16H 61/02 (2006.01)
- F16H 59/60 (2006.01)

(52) U.S. Cl.
CPC ............ *F16H 61/0213* (2013.01); *F16H 59/60* (2013.01); *F16H 2061/0227* (2013.01)
USPC ............................................. 701/58; 477/45

(58) Field of Classification Search
USPC ........ 701/65, 59, 53, 58; 477/98, 45, 108, 97, 477/144
See application file for complete search history.

(56) References Cited

U.S. PATENT DOCUMENTS

| | | | |
|---|---|---|---|
| 3,665,779 A | 5/1972 | Mori | |
| 4,164,876 A | 8/1979 | Peppel | |
| 4,254,998 A | 3/1981 | Marshall et al. | |
| 4,592,565 A | 6/1986 | Eagle | |
| 4,598,611 A | 7/1986 | Frank | |
| 4,601,680 A | 7/1986 | Tokoro et al. | |
| 4,841,815 A | 6/1989 | Takahashi | |
| 4,884,648 A | 12/1989 | Uchida et al. | |
| 4,958,695 A | 9/1990 | Uchida et al. | |
| 5,099,720 A | 3/1992 | Raue | |
| 5,233,523 A | 8/1993 | Follmer | |
| 5,413,541 A | 5/1995 | Nasset | |
| 5,444,307 A | 8/1995 | Sheets et al. | |
| 5,459,658 A | 10/1995 | Morey et al. | |
| 5,521,579 A * | 5/1996 | Bernhard | 340/438 |
| 5,717,592 A | 2/1998 | Oo et al. | |

(Continued)

FOREIGN PATENT DOCUMENTS

| | | |
|---|---|---|
| EP | 425276 | 5/1991 |
| JP | 2-71163 | 5/1990 |

(Continued)

OTHER PUBLICATIONS

RD 323100.

*Primary Examiner* — Marthe Marc-Coleman
(74) *Attorney, Agent, or Firm* — Snell & Wilmer LLP

(57) ABSTRACT

The present invention relates to a method and system for automated control of transmission ratio change which balances the requirements for power with energy efficiency. A plurality of sensors detect environmental conditions of a vehicle. An environmental conditions analysis unit analyzes the environmental conditions to determine whether the detected environmental conditions indicate a likelihood of a transmission ratio increase. When the detected environmental conditions indicate the likelihood of the transmission ratio increase, an automatic transmission changes in operation from a normal state to a prepared state. However, after a predetermined amount of time, the automatic transmission changes from the prepared state back to the normal state when there is no user indication that the transmission ratio should be increased.

16 Claims, 3 Drawing Sheets

(56) References Cited

U.S. PATENT DOCUMENTS

| | | |
|---|---|---|
| 5,857,937 A | 1/1999 | Ashizawa et al. |
| 5,913,916 A | 6/1999 | Bai et al. |
| 5,957,255 A | 9/1999 | Grytzelius |
| 6,042,196 A | 3/2000 | Nakamura et al. |
| 6,067,493 A | 5/2000 | Adachi et al. |
| 6,076,622 A | 6/2000 | Chakraborty et al. |
| 6,098,005 A * | 8/2000 | Tsukamoto et al. ............ 701/65 |
| 6,128,565 A | 10/2000 | Tsutsui et al. |
| 6,205,387 B1 | 3/2001 | Ochiai |
| 6,440,037 B2 | 8/2002 | Takagi et al. |
| 6,442,467 B1 | 8/2002 | Schuler et al. |
| 6,461,261 B2 | 10/2002 | Yamamoto et al. |
| 6,466,851 B2 | 10/2002 | Kato et al. |
| 6,478,713 B1 | 11/2002 | Runde et al. |
| 6,496,771 B2 | 12/2002 | Hattori et al. |
| 6,516,260 B2 | 2/2003 | Wetzel et al. |
| 6,516,664 B2 | 2/2003 | Lynam |
| 6,523,911 B1 | 2/2003 | Rupp et al. |
| 6,524,216 B2 | 2/2003 | Suzuki et al. |
| 6,584,391 B2 | 6/2003 | Lack |
| 6,662,098 B2 | 12/2003 | Hellmann et al. |
| 6,668,225 B2 | 12/2003 | Oh et al. |
| 6,726,594 B2 | 4/2004 | Mizuno et al. |
| 6,821,228 B2 | 11/2004 | Aoki et al. |
| 6,823,250 B2 | 11/2004 | Yamaguchi et al. |
| 6,957,139 B2 | 10/2005 | Bellinger |
| 6,968,736 B2 | 11/2005 | Lynam |
| 6,995,663 B2 | 2/2006 | Geisler et al. |
| 7,113,860 B2 | 9/2006 | Wang |
| 7,139,650 B2 | 11/2006 | Lubischer |
| 7,177,743 B2 | 2/2007 | Roy |
| 7,226,134 B2 | 6/2007 | Horn et al. |
| 7,272,481 B2 | 9/2007 | Einig et al. |
| 7,302,332 B2 | 11/2007 | Nenninger |
| 7,303,505 B2 | 12/2007 | Kanafani et al. |
| 7,363,140 B2 * | 4/2008 | Ewerhart et al. ................ 701/96 |
| 7,392,120 B2 | 6/2008 | Matsumoto et al. |
| 7,393,305 B2 | 7/2008 | Yamada et al. |
| 7,447,583 B2 | 11/2008 | Ogawa |
| 7,548,810 B2 | 6/2009 | Aoki |
| 7,568,996 B2 | 8/2009 | Matsui et al. |
| 7,582,041 B2 | 9/2009 | Suzuki et al. |
| 7,912,615 B2 * | 3/2011 | Lindgren et al. ................. 701/55 |
| 2003/0130780 A1 * | 7/2003 | Shiimado et al. ................ 701/65 |
| 2004/0023755 A1 * | 2/2004 | Nozaki ............................ 477/45 |
| 2005/0049772 A1 | 3/2005 | Liu |
| 2005/0051133 A1 | 3/2005 | Persson et al. |
| 2005/0246096 A1 * | 11/2005 | Bracht et al. ................... 701/211 |
| 2006/0041355 A1 | 2/2006 | Blundell et al. |
| 2006/0167611 A1 * | 7/2006 | Ogawa ............................ 701/96 |
| 2006/0261980 A1 | 11/2006 | Beier |
| 2007/0129214 A1 * | 6/2007 | Kondo et al. ................. 477/144 |
| 2007/0260385 A1 | 11/2007 | Tandy, Jr. et al. |
| 2007/0266700 A1 | 11/2007 | Lang et al. |
| 2008/0027613 A1 | 1/2008 | Bai et al. |
| 2008/0032858 A1 | 2/2008 | Frank et al. |
| 2008/0036296 A1 | 2/2008 | Wu et al. |
| 2008/0147277 A1 | 6/2008 | Lu et al. |
| 2008/0172163 A1 | 7/2008 | Englert et al. |
| 2008/0312030 A1 | 12/2008 | Kurita et al. |
| 2009/0018736 A1 | 1/2009 | Kuwahara |
| 2009/0043468 A1 | 2/2009 | Kondo et al. |
| 2009/0072997 A1 | 3/2009 | Shrum, Jr. |
| 2009/0088938 A1 | 4/2009 | Usukura |
| 2009/0093936 A1 | 4/2009 | Lindgren et al. |
| 2009/0118095 A1 | 5/2009 | Tabata et al. |
| 2009/0143934 A1 * | 6/2009 | Motonaga et al. ............... 701/29 |
| 2009/0157269 A1 | 6/2009 | Matsubara et al. |
| 2009/0219394 A1 | 9/2009 | Heslin |
| 2009/0236159 A1 | 9/2009 | Shibata et al. |
| 2009/0240405 A1 | 9/2009 | Tawara |
| 2009/0250278 A1 | 10/2009 | Kawasaki et al. |
| 2009/0319126 A1 * | 12/2009 | Miyajima et al. ............... 701/41 |
| 2010/0030437 A1 * | 2/2010 | Kim et al. ...................... 701/65 |
| 2010/0256883 A1 * | 10/2010 | Sauter ............................ 701/65 |

FOREIGN PATENT DOCUMENTS

| | | |
|---|---|---|
| JP | 6270713 | 9/1994 |
| JP | 9042444 | 2/1997 |
| JP | 2000-043705 | 2/2000 |
| JP | 2000-272381 | 10/2000 |
| JP | 2001088683 | 4/2001 |
| JP | 2001235016 | 8/2001 |

* cited by examiner

METHOD AND SYSTEM FOR AUTOMATED CONTROL OF TRANSMISSION RATIO CHANGE

BACKGROUND

1. Field

The present invention relates to a method and system for automated control of transmission ratio change. More specifically the present invention relates to a method and system for automated control of transmission ratio change which balances the requirements for power with energy efficiency.

2. Description of the Related Art

In an increasingly busy world, a driver of a vehicle often needs to move from a first location to a second location in a rapid manner. To accomplish this goal, the driver may need to change lanes and/or pass another vehicle in front of his vehicle. However, a time frame to change lanes and/or pass another vehicle is often limited due to an abundance of other vehicles in the other lanes. Thus, to change lanes, the driver must often accelerate the vehicle rapidly. However, due to rising energy costs and a global concern for global warming, conventional vehicles are designed to be fuel efficient when a relatively constant speed or low acceleration is required. To conserve energy, the transmission utilizes a low transmission ratio when the vehicle is traveling in a relatively constant speed or low acceleration.

The low transmission ratio, while relatively energy efficient, produces an insufficient amount of power or torque to rapidly accelerate the vehicle. Thus, the transmission ratio must be increased to reach a target transmission ratio required to accomplish the desired rapid acceleration. However, conventional vehicles do not increase the transmission ratio until there is a user indication that the transmission ratio should be increased, such as when the user sufficiently depresses on the gas pedal.

When the user depresses on the gas pedal, there is a delay in increasing the transmission ratio due to the time required for hydraulic fluid to be filled in the appropriate components of the transmission and also the potential necessity to increase the transmission ratio not once, but multiple times to reach the target transmission ratio. Therefore, there is a delay in increasing the vehicle acceleration after the user depresses on the accelerator pedal. This delay can reduce the ability of the user to sufficiently accelerate the vehicle in the time frame required to change lanes and/or pass another vehicle. The delay can therefore cause the user to have to sharply apply the brakes of the vehicle since he is unable to change lanes, or worse, cause the vehicle to crash into another vehicle or object.

Thus, there is a need for a method and system for automated control of transmission ratio change which balances the requirements for power with energy efficiency.

SUMMARY

The present invention relates to a method and system for automated control of transmission ratio change which balances the requirements for power with energy efficiency. A plurality of sensors detect environmental conditions of a vehicle. An environmental conditions analysis unit analyzes the environmental conditions to determine whether the detected environmental conditions indicate a likelihood of a transmission ratio increase.

When the detected environmental conditions indicate the likelihood of the transmission ratio increase, an automatic transmission changes in operation from a normal state to a prepared state. Advantageously, by changing the automatic transmission from the normal state to the prepared state, the automatic transmission can reach a target transmission rate in a reduced amount of time.

However, after a predetermined amount of time, the automatic transmission changes from the prepared state back to the normal state when there is no user indication that the transmission ratio should be increased. This preserves fuel efficiency in case the user does not actually want to increase the transmission ratio. Thus, the present invention balances the requirements for power with energy efficiency.

In one embodiment, the present invention is a method for automated control of transmission ratio change including detecting environmental conditions of a vehicle, analyzing the detected environmental conditions to determine whether the detected environmental conditions indicate a likelihood of a transmission ratio increase, and changing the operation of a transmission from a normal state to a prepared state when the detected environmental conditions indicate the likelihood of the transmission ratio increase.

In another embodiment, the present invention is a method for automated control of transmission ratio change including detecting environmental conditions of a vehicle, the environmental conditions including at least one of longitudinal acceleration, distance to another vehicle, longitudinal acceleration of the another vehicle, engine input speed, engine output speed, longitudinal speed, steering wheel rotation, or turn signal activation data. The present invention also includes analyzing the detected environmental conditions to determine whether the detected environmental conditions indicate a likelihood of a transmission ratio increase, changing the operation of the transmission from a normal state to a prepared state when the detected environmental conditions indicate the likelihood of the transmission ratio increase, and changing the operation of the transmission from the prepared state to the normal state after a predetermined amount of time has lapsed without a user indication that the transmission ratio should be increased.

In yet another embodiment, the present invention is a system for automated control of transmission ratio change including a sensor detecting environmental conditions of a vehicle, an environmental conditions analysis unit analyzing the detected environmental conditions to determine whether the detected environmental conditions indicate a likelihood of a transmission ratio increase, and a power train control module changing the operation of the transmission from a normal state to a prepared state when the detected environmental conditions indicate the likelihood of the transmission ratio increase.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
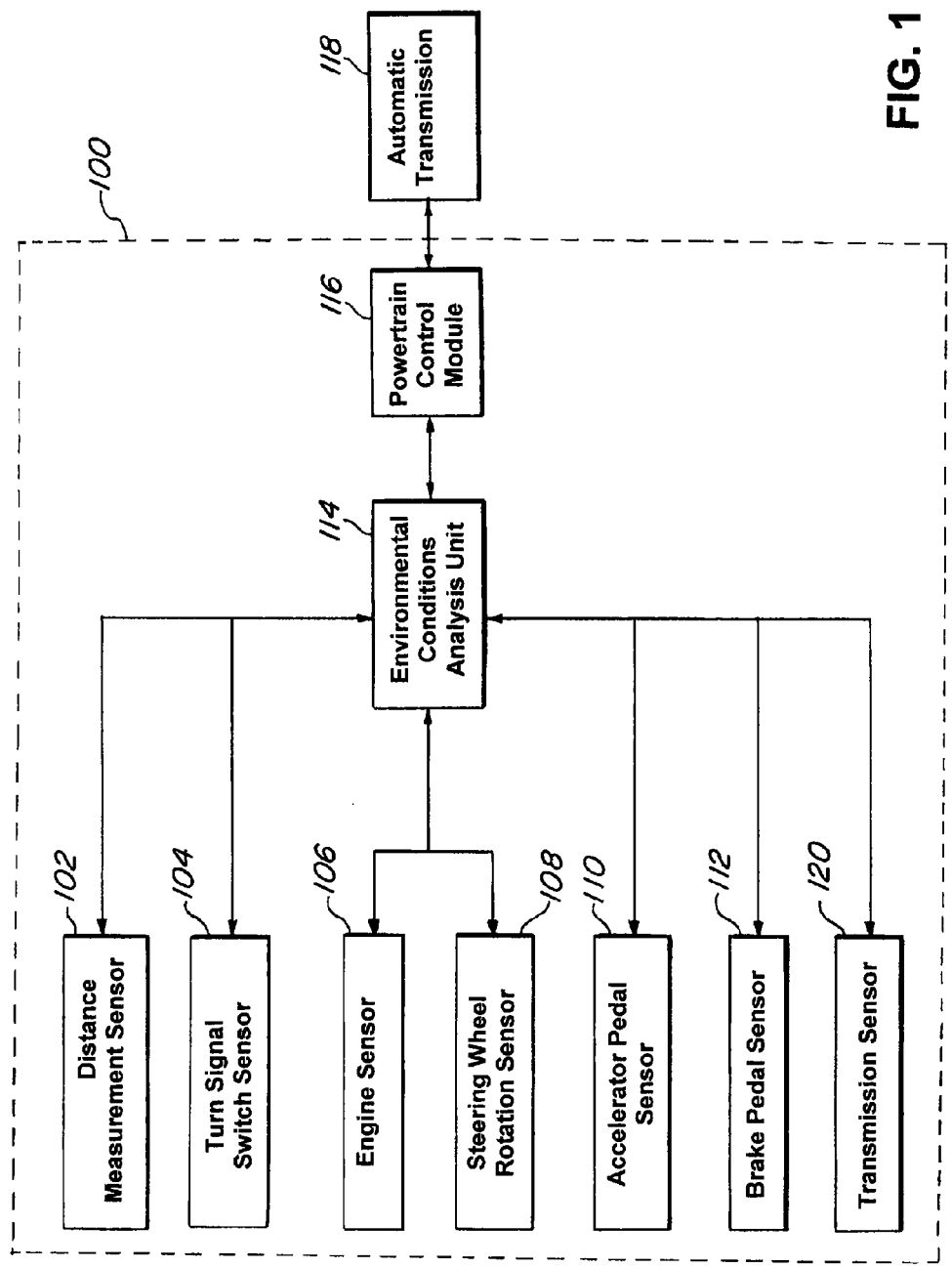
FIG. 1 is a block diagram according to an embodiment of the present invention.

FIG. 1 depicts an automated transmission control system 100 connected to an automatic transmission 118. The automated transmission control system 100 can be embodied, for example, in a vehicle. The vehicle can be, for example, an automobile, an airplane, a boat, or any other types of devices which utilize a transmission. The automobile can be, for example, a gasoline powered automobile, an automobile with a hybrid engine, an electric automobile, a hydrogen powered automobile or any other type of automobile with any type of engine.

The automated transmission control system 100 includes a distance measurement sensor 102, a turn signal switch sensor 104, an engine sensor 106, a steering wheel rotation sensor 108, an accelerator pedal sensor 110, a brake pedal sensor 112, an environmental conditions analysis unit 114, a powertrain control module 116, and a transmission sensor 120.

The distance measurement sensor 102 is connected to the environmental conditions analysis unit 114 and can measure a distance between the vehicle and an object. In one embodiment, the distance measurement sensor 102 measures the distance between the vehicle and an object in front of the vehicle. In another embodiment, the distance measurement sensor 102 measures the distance between the vehicle and an object in back of the vehicle. In yet another embodiment, the distance measurement sensor 102 measures the distance between the vehicle and an object to the side of the vehicle.

The object can be, for example, another vehicle, a wall, debris, a light post, a sidewalk, a barrier, a person, a median, or any other type of material which would be a detriment to the vehicle. The distance measurement sensor 202 can be, for example, an infrared sensor, a laser sensor, an electromagnetic sensor, an imagine device, or any other type of device capable of detecting a distance between two objects.

The distance measurement sensor 102 can be used to determine a longitudinal acceleration of the object, for example, by using the distance between the vehicle and the object. The distance between the vehicle and the object can be sampled and the increase and/or decrease in distance can be used along with the timing of the samples to determine the longitudinal acceleration of the object.

The distance measurement sensor 202 can also be used to determine the longitudinal acceleration and/or the longitudinal speed of the vehicle. In addition, the distance measurement sensor 202 can communicate with the engine sensor 106 to determine the longitudinal acceleration and/or the longitudinal speed of the vehicle.

The turn signal switch sensor 204 is connected to the environmental conditions analysis unit 114 and detects turn signal activation data indicating whether a turn signal is activated in the vehicle. For example, if a user actuates a turn signal lever to activate the turn signal, then the turn signal switch sensor 204 generates the turn signal activation data indicating that the turn signal is active. However, after the vehicle has sufficiently turned such that the turn signal is inactive or if the user manually actuates the turn signal lever again to inactivate the turn signal, then the turn signal switch sensor 204 generates turn signal activation data that the turn signal is inactive.

The engine sensor 106 is connected to the environmental conditions analysis unit 114 and detects operational conditions of an engine (not shown) in the vehicle. The operational conditions can include, for example, engine input speed, engine output speed, throttle opening, fuel/oxygen mixture, engine temperature, fuel consumption, engine failures, engine efficiency, an engine operation mode, or any other type of information related to the operation of the engine. The engine can include, for example, an internal combustion engine, a hybrid engine, an electric engine, a hydrogen engine, a natural gas engine, or any other type of engine.

The steering wheel rotation sensor 108 is connected to the environmental conditions analysis unit 114 and detects a rotation of a steering wheel (not shown) in the vehicle. The steering wheel rotation sensor 108 can detect an amount of rotation of a steering wheel. For example, if a user has rotated a steering wheel by 20 degrees, the steering wheel rotation sensor 108 in a clockwise direction can detect that the user has rotated the steering wheel by 20 degrees in a clockwise direction. The steering wheel rotation sensor 108 can also determine an amount of time that has lapsed since the user has rotated the steering wheel in a particular direction.

The accelerator pedal sensor 110 detects a depression of an accelerator pedal (not shown) in the vehicle. For example, the accelerator pedal sensor 110 can detect if the user completely depresses the accelerator pedal, partially depresses the accelerator pedal, or is not depressing the accelerator pedal at all. The accelerator pedal sensor 110 can also detect how much the user has depressed the accelerator pedal, such as if the user has depressed the accelerator pedal a quarter of the way, or a half of the way. The accelerator pedal sensor 110 can also detect an amount of time that has lapsed since the user has depressed the accelerator pedal.

The brake pedal sensor 112 detects a depression of a brake pedal (not shown) in the vehicle. For example, the brake pedal sensor 112 can detect if the user completely depresses the brake pedal, partially depressed the brake pedal, or is not depressing the brake pedal at all. The brake pedal sensor 112 can also detect how much the user has depressed the brake pedal, such as if the user has depressed the brake pedal a quarter of the way, or a half of the way. The brake pedal sensor 112 can also detect an amount of time that has lapsed since the user has depressed the brake pedal.

The transmission sensor 120 is connected to the environmental conditions analysis unit 114. The transmission sensor 120 detects the operational mode of the automatic transmission 118. For example, the transmission sensor 120 can detect whether the transmission 120 is operating in an alternate transmission control mode. The alternate transmission control mode can be, for example, a cruise control mode, a snow mode, and/or an electric power only mode. In the cruise control mode, the vehicle is maintaining a constant speed as indicated by the user. In the snow mode, specific transmission ratios are used to better allow the vehicle to move under ice, slush, and/or snow conditions with a reduced risk of skidding or becoming stuck. In the electric power only mode, electric and/or hybrid vehicles are utilizing only electric powers instead of gasoline or alternative fuel sources.

The environmental conditions analysis unit 114 is connected to the distance measurement sensor 102, the turn signal switch sensor 104, the engine sensor 106, the steering wheel rotation sensor 108, the accelerator pedal sensor 110, the brake pedal sensor 112, the transmission sensor 120, and the powertrain control module 116. The environmental conditions analysis unit 114 analyzes detected environmental conditions from the distance measurement sensor 102, the turn signal switch sensor 104, the engine sensor 106, the steering wheel rotation sensor 108, the accelerator pedal sensor 110, the transmission sensor, and/or the brake pedal sensor 112 to determine whether there is a likelihood of a transmission ratio increase. The environmental conditions can include, for example, longitudinal acceleration, distance to another object or vehicle, longitudinal acceleration of the another vehicle, engine input speed, engine output speed, longitudinal speed, steering wheel rotation, turn signal activation data, and/or alternate transmission control mode.

A likelihood of a transmission ratio increase occurs when it is likely that the user will be increasing the acceleration of the vehicle, requiring an increase in the transmission ratio, prior to the user actually depressing the accelerator pedal in a manner to increase the acceleration of the vehicle. The likelihood of transmission increase can occur, for example, when the user is preparing to accelerate the vehicle to pass another vehicle. The present invention can thus prepare the vehicle for acceleration prior to the user depressing the accelerator pedal to increase the acceleration of the vehicle, resulting in a reduced delay in accelerating the vehicle.

Once a determination is made regarding the likelihood of the transmission ratio increase, the environmental conditions analysis unit 114 can use the powertrain control module 116 to instruct the automatic transmission 118 to maintain its current state, transition from a normal state to a prepared state, or transition from the prepared state to the normal state. The prepared state prepares the transmission to reach a targeted transmission ratio in a reduced amount of time, allowing the vehicle to begin acceleration with less delay.

Figure 2:
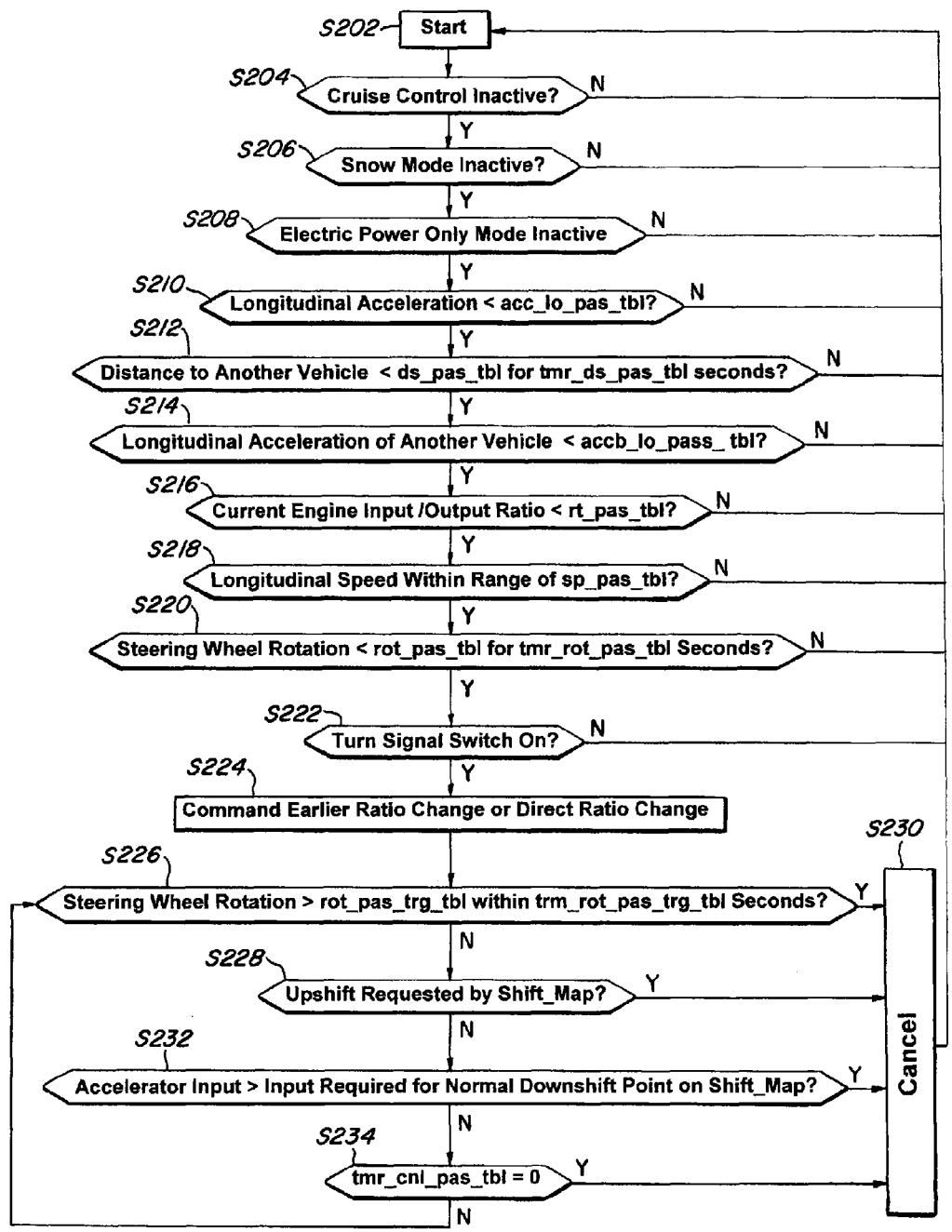
FIG. 2 is a flow chart of a process according to an embodiment of the present invention.

The operational process of the environmental conditions analysis unit 114 can be seen, for example in FIG. 2. In Step S202, the process begins. In Steps S204, S206, and S208, the environmental conditions analysis unit 114 determines whether the vehicle is operating in the alternate transmission control mode, such as whether the vehicle is operating in a cruise control mode, a snow mode, or an electric power only mode.

If the vehicle is operating in the alternate transmission control mode, then the environmental conditions analysis unit 114 automatically determines that there is no likelihood of a transmission ratio increase. This is because when the vehicle is operating in the alternate transmission control mode, the user is indicating that he would like to operate the vehicle in a specific manner, such as moving at a constant speed, having more control to prevent skidding and/or being stuck, or using a specific power source. When the vehicle operates in the specific manner as indicated by the user, there is a reduced likelihood that the user will want to increase the transmission ratio and the environmental conditions analysis unit 114 repeats the process at Step S202. Otherwise the environmental conditions analysis unit 114 proceeds to Step S210.

If the vehicle is not operating in the alternate transmission control mode, the environmental conditions analysis unit 114 determines whether the longitudinal acceleration of the vehicle is less than an acceleration required to pass another vehicle (acc_lo_pas_tbl) in Step S210. The acceleration required to pass another vehicle can be determined, for example, using a look-up table (not shown) stored in the environmental conditions analysis unit 114. If the longitudinal acceleration of the vehicle is sufficient to pass another vehicle, then there is no or a reduced likelihood of a transmission ratio increase and the environmental conditions analysis unit 114 repeats the process at Step S202. Otherwise the environmental conditions analysis unit 114 proceeds to Step S212.

In Step S212, if the vehicle is not accelerating sufficiently to pass another vehicle, the environmental conditions analysis unit 114 determines whether the distance to another vehicle is less than a predetermined distance threshold. The predetermined distance threshold can be a distance where passing another vehicle is not required if the current longitudinal speed and/or longitudinal acceleration is maintained (ds_pas_tbl) based on an amount of time it would take for the vehicle to traverse the distance to another vehicle and collide with another vehicle from the current longitudinal speed and/or longitudinal acceleration of the vehicle (tmr_ds_pas_tbl seconds).

Thus, for example, if the distance between the vehicle and another vehicle is 800 feet, and the vehicle is only traveling 45 miles per hour with no acceleration, then passing another vehicle may not be required based on the current speed and acceleration of the vehicle. However, if the distance between the vehicle and another vehicle is only 30 feet, and the vehicle is traveling 60 miles per hour with a small acceleration, then passing another vehicle may be required based on the current speed and acceleration of the vehicle. If the distance to another vehicle is greater than or equal to the predetermined distance threshold, then the environmental conditions analysis unit 114 repeats the process at Step S202. Otherwise the environmental conditions analysis unit 114 proceeds to Step S214.

In Step S214, if the vehicle distance is less than the predetermined distance threshold, then the environmental analysis unit 114 determines whether the longitudinal acceleration of the another vehicle is below a predetermined acceleration threshold for the another vehicle (accb_lo_pass_tbl). The predetermined acceleration threshold for the another vehicle can be an acceleration based on the acceleration of the vehicle, the speed of the vehicle, and the distance between the vehicle and the another vehicle.

Thus, for example, if the distance between the vehicle and another vehicle is 800 feet, and the vehicle is only traveling 45 miles per hour with no acceleration, then the predetermined acceleration threshold for the another vehicle may be relatively low. However, if the distance between the vehicle and another vehicle is only 30 feet, and the vehicle is traveling 60 miles per hour with a small acceleration, then the predetermined acceleration threshold for the another vehicle may be relatively high. If the longitudinal acceleration of the another vehicle is greater than the predetermined acceleration threshold for the another vehicle, then the environmental conditions analysis unit 114 repeats the process at Step S202. Otherwise the environmental conditions analysis unit 114 proceeds to Step S216.

In Step S216, the environmental conditions analysis unit 114 determines whether the engine input/output ratio is less than the ratio required to pass another vehicle (rt_pass_tbl) using a look-up table (not shown) in the environmental conditions analysis unit 114. The engine input/output ratio can correspond, for example, to the transmission ratio. Thus, for example, if the engine input/output ratio is sufficient to pass another vehicle, then the transmission ratio is sufficient to pass another vehicle. It would therefore be unnecessary to increase the transmission ratio. However, if the engine input/output ratio is insufficient to pass another vehicle, then the transmission ratio is insufficient to pass another vehicle. In such a case, the transmission ratio will need to be increased if the user wishes to pass another vehicle. If the engine input/output ratio is greater than the ratio required to pass another vehicle, then the environmental conditions analysis unit 114 repeats the process at Step S202. Otherwise the environmental conditions analysis unit 114 proceeds to Step S218.

In Step S218, the environmental conditions analysis unit 114 determines whether the longitudinal speed of the vehicle is within a speed range for passing another vehicle (sp_pas_tbl) using a look-up table (not shown) in the environmental conditions analysis unit 114. The speed range can indicate the speed range where it is safe to pass another vehicle and/or the speeds range where it would be acceptable to increase the transmission ratio when passing another vehicle. If the environmental conditions analysis unit 114 determines that the longitudinal speed of the vehicle is outside a speed range for passing another vehicle, then the environmental conditions analysis unit 114 repeats the process at Step S202. Otherwise the environmental conditions analysis unit 114 proceeds to Step S220.

In Step S220, the environmental conditions analysis unit 114 determines whether the steering wheel has rotated beyond a predetermined maximum rotation threshold (rot_pas_tbl) for a greater than a predetermined maximum rotation time (tmr_rot_pas_tbl) using a look-up table (not shown) in the environmental conditions analysis unit 114. The predetermined maximum rotation threshold and the predetermined maximum rotation time can be defined, for example, to correspond to instances where the user is performing a U-turn. In such a situation, the steering wheel will be rotated extensively for a period of time. In such a case, it is unlikely that the user will want to increase the transmission ratio.

If the environmental conditions analysis unit 114 determines that the steering wheel has rotated beyond a predetermined maximum rotation threshold for a greater than a predetermined maximum rotation time, then the environmental conditions analysis unit 114 repeats the process at Step S202. Otherwise the environmental conditions analysis unit 114 proceeds to Step S222.

In Step S222, the environmental conditions analysis unit 114 determines whether the turn signal switch is on using the turn signal switch sensor 104. If the turn signal is activated, it supports the notion that the user wants to pass another vehicle. However, if the turn signal is not activated, then it is unlikely that the user wants to pass another vehicle. If the environmental conditions analysis unit 114 determines that the turn signal is not activated, then the environmental conditions analysis unit 114 repeats the process at Step S202. Otherwise the environmental conditions analysis unit 114 proceeds to Step S224.

In Step S224, there is a likelihood of a transmission ratio increase, and the environmental conditions analysis unit 114 transmits a signal to the powertrain control module 116 indicating that the powertrain control module 116 should change the operation of the automatic transmission 118 from a normal state to a prepared state. In the normal state, the automatic transmission 118 operates in a conventional manner. In the prepared state, however, hydraulic pressure is increased in the automatic transmission 118 or a transmission ratio is increased.

The prepared state allows the user to increase the transmission ratio to a target transmission ratio with a reduced amount of delay. Since conventional transmissions have a delay in increasing the hydraulic pressure, there is also a delay in increasing the transmission ratio to the target transmission ratio, especially when the transmission ratio needs to be increased multiple times to reach the target transmission ratio. Thus, by increasing hydraulic pressure, before the user actually depresses the accelerator pedal to increase the acceleration and the transmission ratio, the delay in increasing the transmission ratio is decreased. This results in a reduced delay in accelerating the vehicle.

In an alternate embodiment, the transmission ratio can actually be increased before the user indicates that the transmission ratio should be increased by depressing on the accelerator pedal. Thus, the number of times the transmission ratio needs to be increased can be reduced, which reduces the overall delay in reaching the target transmission ratio. For example, if to reach the target transmission ratio, the transmission ratio needs to be increased only once, then the powertrain control module 116 will increase the transmission ratio to the target transmission ratio before the user depresses the accelerator pedal to indicate that he wishes to increase the transmission ratio to the target transmission ratio. When the user depresses the accelerator pedal to indicate that he wishes to increase the transmission ratio to the target transmission ratio, the vehicle (i.e., the automatic transmission 118) will already be at the target transmission ratio and the vehicle can accelerate without much delay.

However, if to reach the target transmission ratio, the transmission ratio needs to be increased twice, then the powertrain control module 116 will increase the transmission ratio once before the user depresses the accelerator pedal to increase the transmission ratio to the target transmission ratio. When the user depresses the accelerator pedal to indicate that he wishes to increase the transmission ratio to the target transmission ratio, the vehicle only needs to increase the transmission ratio once instead of twice. In one embodiment, the powertrain control module 116 can increase the transmission ratio twice or more before the user depresses the accelerator pedal.

By reducing the delay in increasing the transmission ratio to the desired target transmission ratio, the user can begin accelerating his vehicle more quickly, which in turn allows him to reach his destination or desired passing maneuver more quickly. Thus, the user is more likely to be able to pass the vehicle in front of him since he can seize upon the small window of time in which the lane adjacent his vehicle is open without much delay.

The environmental conditions analysis unit 114 can also determine whether there is a user indication that the transmission ratio should be increased within a predetermined time period of the transmission switching from the normal state to the prepared state in Steps S226 to Step S234. If there is no user indication that the transmission ratio should be increased within the predetermined time period, then the environmental conditions analysis unit 114 transmits a signal to the power control module 116 indicating that the powertrain control module 116 should change the operation of the automatic transmission 118 from the prepared state to the normal state in Step S330.

In one embodiment, a user indication that the transmission ratio should be increased includes rotating a steering wheel beyond a predetermined minimum rotation threshold within a predetermined minimum rotation time period. For example, in Step S226, the environmental conditions analysis unit 114 determines whether the steering wheel has rotated beyond a predetermined minimum rotation threshold (rot_pas_trg_tbl) within a predetermined minimum rotation time period (tmr_rot_pas_trg_tbl). If the user has not rotated the steering wheel within the minimum rotation time period, then it is unlikely that the user wants to pass another vehicle, since the user has to turn the steering wheel in order to pass the another vehicle. If the environmental conditions analysis unit 114 determines that the steering wheel has not rotated beyond the predetermined minimum rotation threshold within the predetermined minimum rotation time period, then the environmental conditions analysis unit 114 proceeds to Step S330 and instructs the powertrain control module 116 to change the operation of the automatic transmission 118 from the prepared state to the normal state. Otherwise the environmental conditions analysis unit 114 proceeds to Step S228.

In another embodiment, there is no user indication that the transmission ratio should be increased when there is a request for an upshift (transmission ratio decrease) in a shift map. Thus, in Step S228, the environmental conditions analysis unit 114 determines whether an upshift was requested by a shift map. If the user does not perform any action which would lead to an upshift by the shift map, then the user may want a transmission ratio increase. However, if the user performs any action which would lead to an upshift by the shift map, then it is likely that the user does not want a transmission ratio increase since the user has specifically requested that the transmission ratio should be decreased instead of increased. If the environmental conditions analysis unit 114 determines that an upshift was requested by a shift map, then the environmental conditions analysis unit 114 proceeds to Step S330 and instructs the powertrain control module 116 to change the operation of the automatic transmission 118 from the prepared state to the normal state. Otherwise the environmental conditions analysis unit 114 proceeds to Step S232.

In yet another embodiment, a user indication that the transmission ratio should be increased includes providing an acceleration input greater than an input required for normal downshift point (transmission ratio increase) on a shift map. Thus, in Step S232, the environmental conditions analysis unit 114 determines whether there is an accelerator input greater than an input required for normal downshift point (transmission ratio increase) on a shift map. The accelerator input can be obtained, for example, from the accelerator pedal sensor 110. If the accelerator input is greater than the input required for a normal downshift point on a shift map, the environmental conditions analysis unit 114 proceeds to Step S330 and instructs the powertrain control module 116 to change the operation of the automatic transmission 118 from the prepared state to the normal state. Otherwise the environmental conditions analysis unit 114 proceeds to Step S234.

In Step S234, a timer maintains a time count (tmr_cnl_pas_tbl) to determine whether a user indication that the transmission ratio should be increased is received within a predetermined period of time. If the user has not provided an indication that the transmission ratio should be increased within the predetermined period of time, then it is likely that the user does not intend to accelerate rapidly, change lanes, and/or pass another vehicle. Thus, the environmental conditions analysis unit 114 proceeds to Step S330 and instructs the powertrain control module 116 to change the operation of the automatic transmission 118 from the prepared state to the normal state in order to preserve energy efficiency in Step S230. Otherwise if the predetermined period of time has not expired, the environmental conditions analysis unit 114 proceeds to Step S226 and loops from Steps S226 to S234 until the predetermined period of time has expired.

The present invention therefore balances the requirements for power with energy efficiency by transitioning the transmission from the normal state to the prepared state when there is a likelihood of a transmission ratio increase and transitioning the transmission from the prepared state to the normal state when the user does not provide an indication that the transmission ratio should be increased.

In FIG. 2, when the environmental conditions analysis unit 114 proceeds to Step S202, the environmental conditions analysis unit 114 can optionally instruct the powertrain control module 116 to operate the automatic transmission at its current state. Furthermore, some of the Steps S220 to S234 may be omitted. In addition, the present invention can also collect behavioral data of the user to adaptively determine which factors most likely indicate a likelihood of a transmission ratio increase. Thus, the present invention can adaptively eliminate or add factors as illustrated, for example, in Steps S202 to S234. Likewise, the present invention can also collect behavioral data of the user to adaptively determine which factors most accurately confirm a user indication that the transmission ratio should be increased. Thus, the present invention can adaptively eliminate or add such user indications as illustrated, for example, in Steps S202 to S234.

Figure 3:
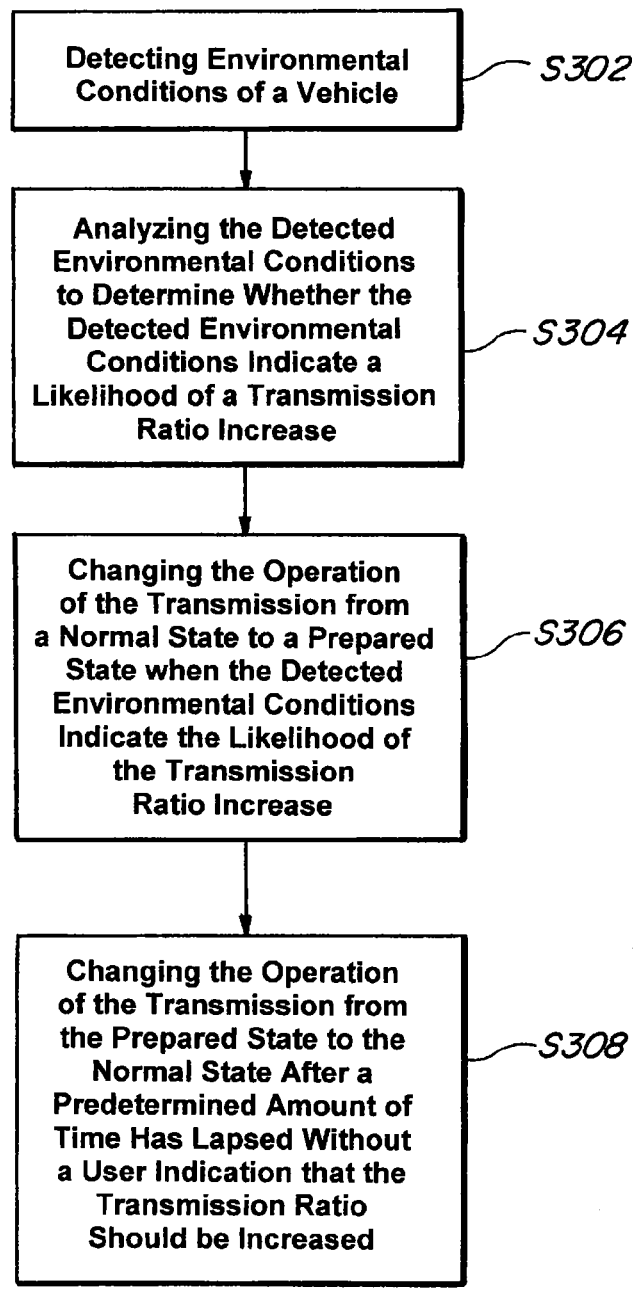
FIG. 3 is a flow chart of a process according to another embodiment of the present invention.

In another embodiment, the present invention is a process as disclosed in FIG. 3. In Step S302, environmental conditions of the vehicle are detected. The environmental conditions can be detected, for example, using the distance measurement sensor 102, the turn signal switch sensor 104, the engine sensor 106, the steering wheel rotation sensor 108, the accelerator pedal sensor 110, the brake pedal sensor 112, and/or the transmission sensor 120.

In Step S304, the detected environmental conditions are analyzed to determine whether the detected environmental conditions indicate a likelihood of a transmission ratio increase. For example, the environmental conditions analysis unit 114 can analyze the longitudinal acceleration of the vehicle, the distance to another vehicle, the longitudinal acceleration of the another vehicle, the engine input speed, the engine output seed, the longitudinal speed of the vehicle, the steering wheel rotation, the turn signal activation data, and/or the alternate transmission control mode to determine whether the detected environmental conditions indicate a likelihood of a transmission ratio increase.

In Step S306, the transmission changes from a normal state to a prepared state when the detected environmental conditions indicate a likelihood of a transmission ratio increase. For example, the environmental conditions analysis unit 114 can instruct the powertrain control module 116 to operate the automatic transmission 118 in the prepared state instead of the normal state when the detected environmental conditions indicate a likelihood of a transmission ratio increase.

In Step S308, the transmission is changed from the prepared state back to the normal state after a predetermined period of time has lapsed without the user indicating that the transmission ratio should be increased. For example, the environmental conditions analysis unit 114 can instruct the powertrain control module 116 to operate the automatic transmission 118 in the normal state instead of the prepared state when a predetermined period of time has lapsed without the user indicating that the transmission ratio should be increased.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for automated control of transmission ratio change of a transmission for a first vehicle, the method comprising:
   detecting environmental conditions of the first vehicle;
   determining whether the detected environmental conditions indicate a likelihood of a transmission ratio increase based on whether a longitudinal acceleration of the first vehicle is sufficient to pass a second vehicle;
   maintaining the operation of the transmission in a normal state when the detected environmental conditions indicate no likelihood of the transmission ratio increase;
   changing the operation of the transmission from the normal state to a prepared state when the detected environmental conditions indicate the likelihood of the transmission ratio increases;
   detecting, using an acceleration pedal sensor, an acceleration input by a user of the first vehicle;
   changing the operation of the transmission from the prepared state to the normal state for preserving energy efficiency when the acceleration input is greater than an acceleration input threshold value for a downshift or a transmission ratio increase, the acceleration input threshold value for the downshift or the transmission ratio increase being stored in a shift map of the first vehicle;
   maintaining a time count to determine whether a user indication that the transmission ratio should be increased is received within a predetermined period of time; and
   automatically changing the operation of the transmission from the prepared state to the normal state after the predetermined amount of time has lapsed even when the acceleration input is not greater than the acceleration input threshold value for the downshift or the transmission ratio increase.

2. The method of claim 1 wherein the user indication that the transmission ratio should be increased includes rotating a steering wheel beyond a predetermined rotational threshold.

3. The method of claim 1 wherein the environmental conditions further include at least one of a distance to the second vehicle, an engine input speed, an engine output speed, a longitudinal speed, a steering wheel rotation, or a turn signal activation data.

4. The method of claim 1 further comprising maintaining an operation of the transmission in the normal state with no likelihood of the transmission ratio increase when an alternate transmission control mode is active, wherein the alternate transmission control mode is at least one of a cruise control mode, a snow mode, or an electric power only mode.

5. The method of claim 1 wherein the prepared state includes increasing a hydraulic pressure in the transmission.

6. The method of claim 1 wherein the prepared state includes increasing the transmission ratio.

7. A method for automated control of transmission ratio change of a transmission, the method comprising:
   maintaining an operation of the transmission in a normal state with no likelihood of a transmission ratio increase when an alternate transmission control mode is active;
   detecting environmental conditions of a first vehicle, the environmental conditions including a longitudinal acceleration of the first vehicle, a longitudinal acceleration of a second vehicle, and at least one of a distance to the second vehicle, an engine input speed, an engine output speed, a longitudinal speed, a steering wheel rotation, or turn signal activation data;
   determining whether the detected environmental conditions indicate a likelihood of a transmission ratio increase based on whether the longitudinal acceleration of the first vehicle is sufficient as compared with the longitudinal acceleration of the second vehicle in order for the first vehicle to pass the second vehicle;
   changing the operation of the transmission from the normal state to a prepared state when the detected environmental conditions indicate the likelihood of the transmission ratio increase and the alternate transmission mode is not active;
   detecting, using an acceleration pedal sensor, an acceleration input by a user of the first vehicle;
   changing the operation of the transmission from the prepared state to the normal state for preserving energy efficiency when the acceleration input is greater than an acceleration input threshold value for a downshift or a transmission ratio increase, the acceleration input threshold value for the downshift or the transmission ratio increase being stored in a shift map of the first vehicle;
   changing the operation of the transmission from the prepared state to the normal state when the steering wheel rotation indicates no likelihood of the transmission ratio increase;
   maintaining, using a timer, a time count to determine whether a user indication that the transmission ratio should be increased is received within a predetermined period of time; and
   automatically changing the operation of the transmission from the prepared state to the normal state after the predetermined amount of time has lapsed even when the acceleration input is not greater than the acceleration input threshold value for the downshift or the transmission ratio increase and even when the steering wheel rotation does not indicate that there is no likelihood of the transmission ratio increase.

8. The method of claim 7 wherein the prepared state includes increasing a hydraulic pressure in the transmission.

9. The method of claim 7 wherein the prepared state includes increasing the transmission ratio.

10. The method of claim 7 wherein the alternate transmission control mode is at least one of a cruise control mode, a snow mode, or an electric power only mode.

11. A system for automated control of transmission ratio change comprising:
- a power train control module configured to maintain an operation of a transmission in a normal state with no likelihood of a transmission ratio increase when an alternate transmission control mode is active;
- a sensor detecting environmental conditions of a first vehicle that include a longitudinal acceleration of the first vehicle and a longitudinal acceleration of a second vehicle;
- an engine sensor configured to detect an engine input speed and an engine output speed;
- an acceleration pedal sensor configured to detect an acceleration input by a user of the first vehicle; and
- an environmental conditions analysis unit configured to:
  - determine whether a ratio of the engine input speed over the engine output speed is greater than an engine input speed over engine output speed ratio threshold value stored in a look-up table of the environmental conditions analysis unit, and
  - determine whether the detected environmental conditions indicate a likelihood of a transmission ratio increase based on whether the longitudinal acceleration of the first vehicle is sufficient as compared with the longitudinal acceleration of the second vehicle in order for the first vehicle to pass the second vehicle, the step of determining whether the detected environmental conditions indicate the likelihood of the transmission ratio increase being performed when or after the ratio of the engine input speed over the engine output speed is determined to be greater than the engine input speed over engine output speed ratio threshold value, wherein the power train control module is further configured to:
- maintain the operation of the transmission in the normal state when the detected environmental conditions indicate no likelihood of the transmission increase,
- change the operation of the transmission from the normal state to a prepared state when the detected environmental conditions indicate the likelihood of the transmission ratio increase and the alternate transmission mode is not active, and
- change the operation of the transmission from the prepared state to the normal state for preserving energy efficiency when the acceleration input is greater than an acceleration input threshold value for a downshift or a transmission ratio increase, the acceleration input threshold value for the downshift or the transmission ratio increase being stored in a shift map of the first vehicle.

12. The system of claim 11 wherein the environmental conditions analysis unit is further configured to maintain a time count to determine whether a user indication that the transmission ratio should be increased is received within a predetermined period of time, and
wherein the power train control module is configured to change the operation of the transmission from the prepared state to the normal state after the predetermined amount of time has lapsed even when the ratio of the engine input speed over the engine output speed is not greater than the engine input speed over engine output speed ratio threshold value and even when the acceleration input is not greater than the acceleration input threshold value for the downshift or the transmission ratio increase.

13. The system of claim 11 wherein the environmental conditions include at least one of a distance to the second vehicle, a longitudinal speed, a steering wheel rotation, or a turn signal activation data.

14. The system of claim 11 wherein the alternate transmission control mode is at least one of a cruise control mode or a snow mode.

15. The system of claim 11 wherein the prepared state includes increasing a hydraulic pressure in the transmission.

16. The system of claim 11 wherein the prepared state includes increasing the transmission ratio.

* * * * *